Nov. 7, 1967

C. O. MERCKLE 3,351,699

RACEWAY FOR ELECTRICAL CABLES AND WIRES
ADAPTED TO RETAIN RF ENERGY

Filed March 19, 1965

INVENTOR

CLAUDE O. MERCKLE

BY B. P. Fishleum, Jr.

ATTORNEY

Nov. 7, 1967

C. O. MERCKLE 3,351,699

RACEWAY FOR ELECTRICAL CABLES AND WIRES
ADAPTED TO RETAIN RF ENERGY

Filed March 19, 1965

INVENTOR
CLAUDE O. MERCKLE

BY *B. P. Fishburn, Jr.*

ATTORNEY

Nov. 7, 1967  C. O. MERCKLE  3,351,699
RACEWAY FOR ELECTRICAL CABLES AND WIRES
ADAPTED TO RETAIN RF ENERGY
Filed March 19, 1965 6 Sheets-Sheet 3
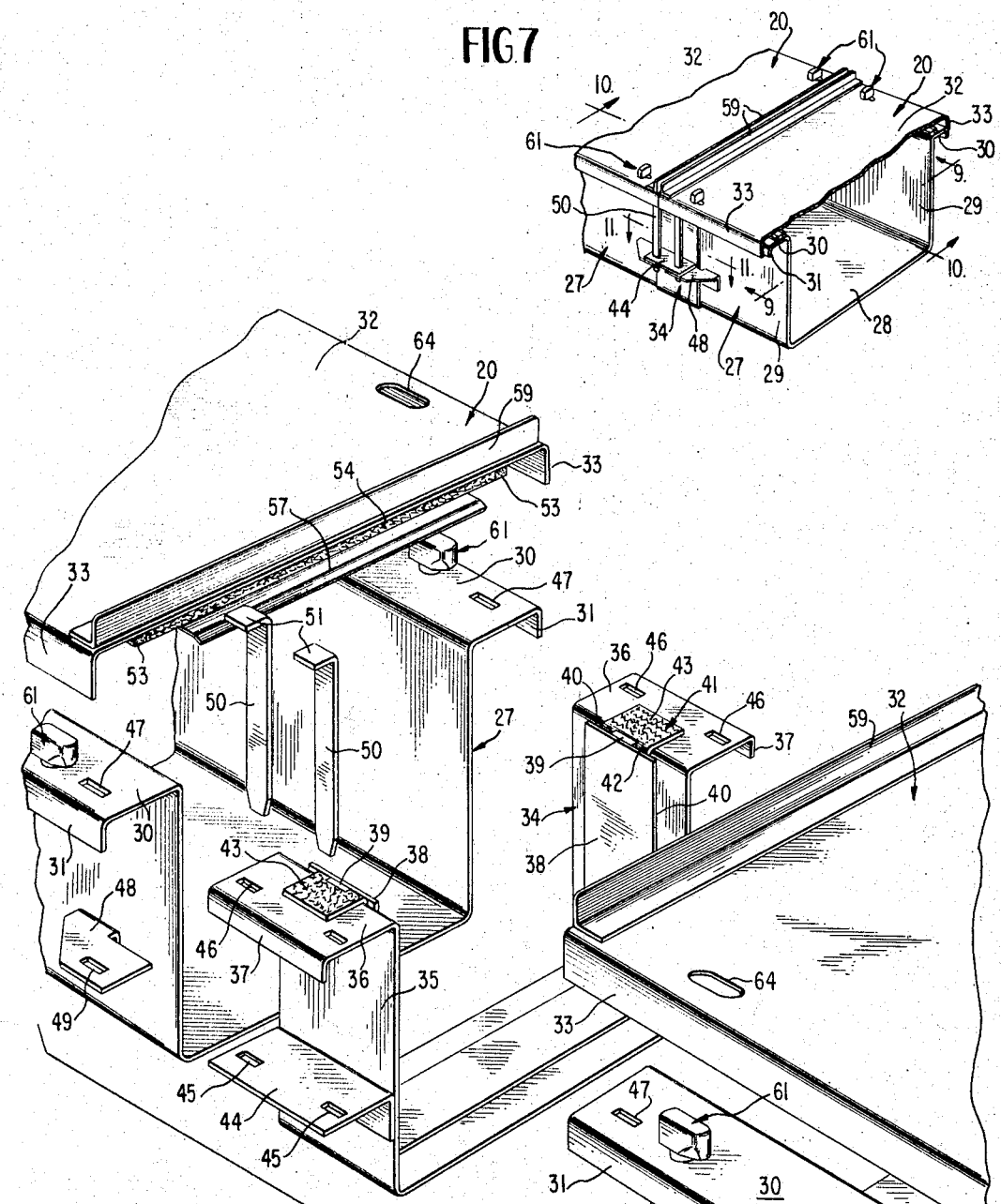
FIG 7
FIG 8
INVENTOR
CLAUDE O. MERCKLE
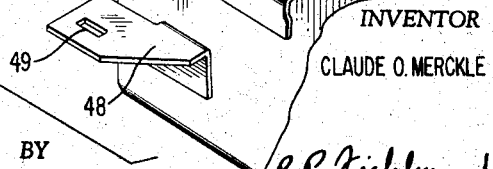
BY
ATTORNEY

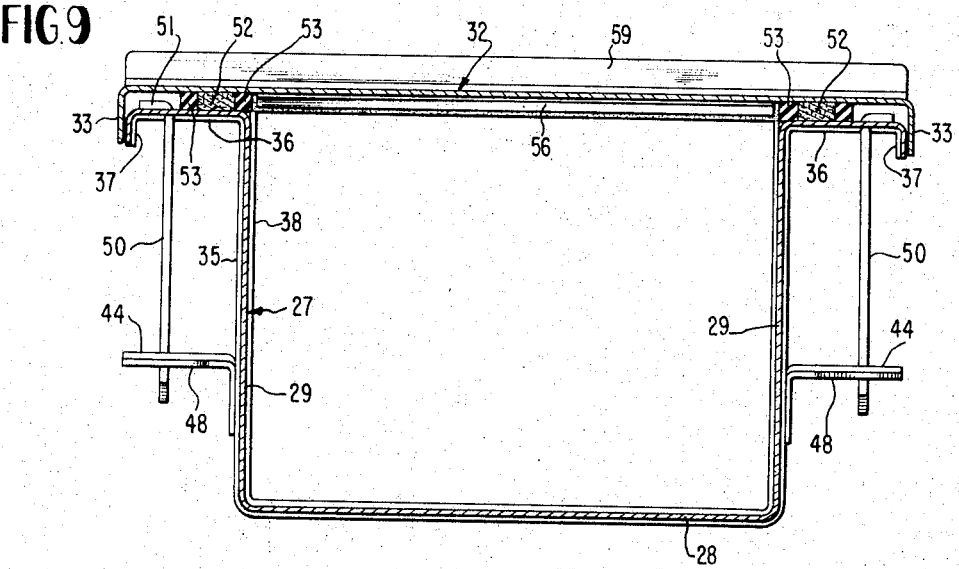
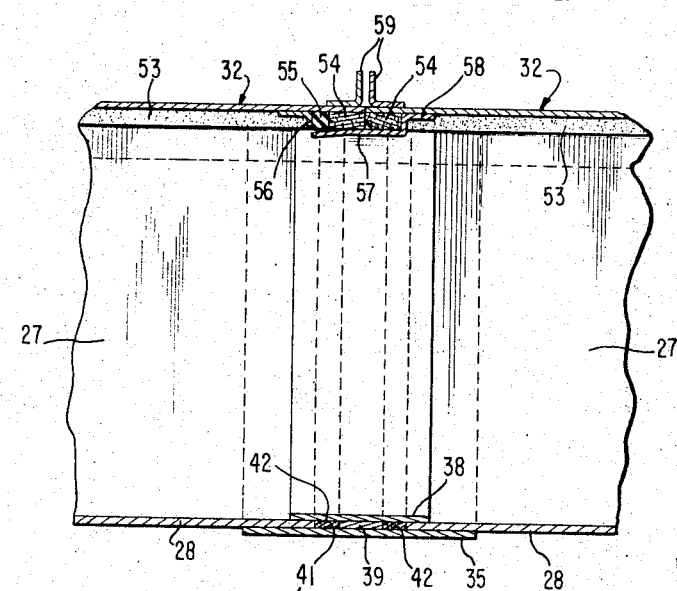
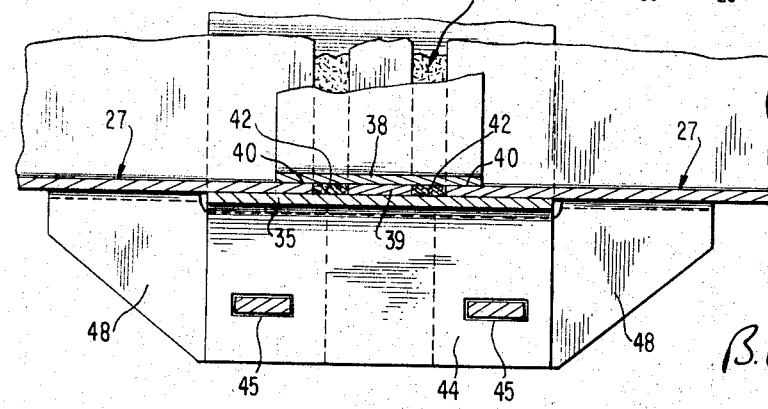

Nov. 7, 1967

C. O. MERCKLE 3,351,699

RACEWAY FOR ELECTRICAL CABLES AND WIRES
ADAPTED TO RETAIN RF ENERGY

Filed March 19, 1965

INVENTOR
CLAUDE O. MERCKLE

BY
B.P. Fishburn Jr.
ATTORNEY

Nov. 7, 1967
C. O. MERCKLE
3,351,699
RACEWAY FOR ELECTRICAL CABLES AND WIRES
ADAPTED TO RETAIN RF ENERGY
Filed March 19, 1965
6 Sheets-Sheet 6
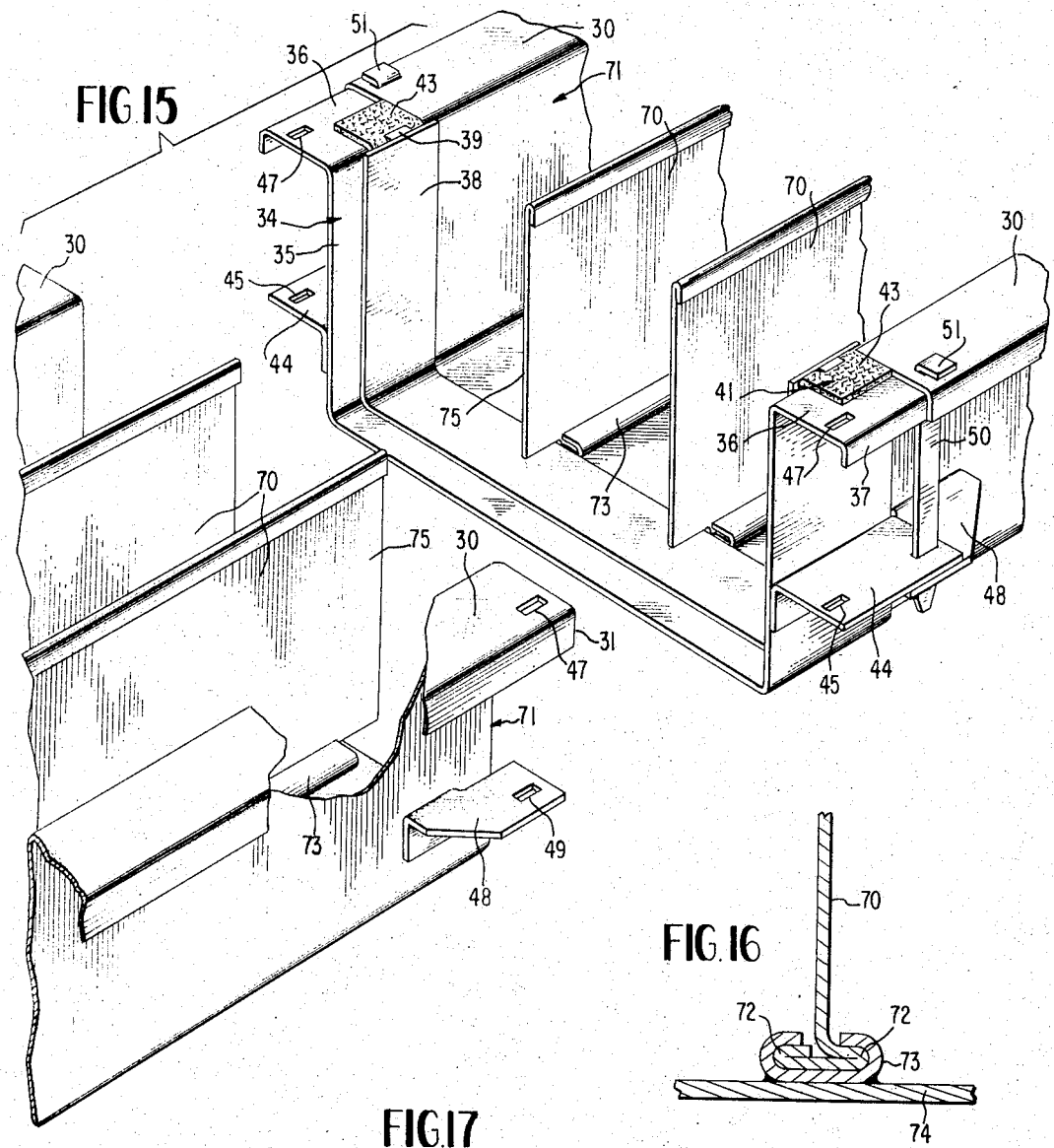
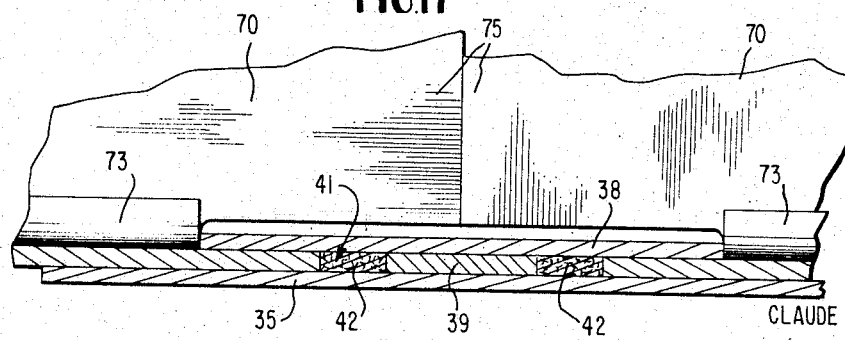
INVENTOR
CLAUDE O. MERCKLE
BY
B. P. Fishburn, Jr.
ATTORNEY United States Patent Office 3,351,699
Patented Nov. 7, 1967

3,351,699
RACEWAY FOR ELECTRICAL CABLES AND
WIRES ADAPTED TO RETAIN RF ENERGY
Claude O. Merckle, Hagerstown, Md., assignor to The
Danzer Metal Works Co., Inc., Hagerstown, Md., a
corporation of Maryland
Filed Mar. 19, 1965, Ser. No. 441,149
10 Claims. (Cl. 174—35)

ABSTRACT OF THE DISCLOSURE

A raceway or duct for communications cables into which the cables may be laid conveniently. The raceway is sectional and each section embodies a cable receiving body portion and a readily removable cover. The various sections are connected by joints whose construction is uniform throughout the raceway system. The raceway is capable of retaining RF energy without leakage through the provision of metallic RF energy shielding gasketing between all sections and their covers and around all joints or connections between sections.

---

This invention relates to ducts or raceways for communication cables or wires.

The principal object of the invention is to provide a raceway which is substantially radio-frequency energy tight in the sense of preventing the escape from the raceway by conduction or radiation of radio signals emanating from the cables or wires therein.

Another object of the invention is to provide a cable raceway of the mentioned character which will permit ready access to the cables which are laid therein at substantially any point or points along the raceway system.

Another object of the invention is to provide in a cable raceway of the class mentioned a typical mechanical slip joint or connection which is standard in construction throughout the entire system and also efficient in maintaining the raceway RF energy tight at all of the joints therealong.

Another important object of the invention is to utilize a particular material for the duct or raceway and a particular coating on the material in order to achieve the greatest possible degree of shielding or confining of radio signals which are produced by communications cables and the like. Toward the same end, a particular metallic gasketing material is employed at all joints along the system and between the body portion of the raceway and its various cover sections.

Still another object of the invention is to provide a cable raceway of the class mentioned which is reasonably economical in construction, easy to install and service, and highly reliable and efficient for its intended purposes.

Other objects and advantages of the invention will become apparent during the course of the following detailed description.

In the accompanying drawings forming a part of this application and in which like numerals are employed to designate like parts throughout the same, FIGURE 1 is a perspective view, on a greatly reduced scale, of a portion of a cable raceway which may be constructed from invention components;

FIGURE 7 is a perspective view on a reduced scale of a fragmentary portion of the cable raceway showing a typical assembled joint therein;

FIGURE 8 is an enlarged exploded perspective view of the typical joint shown in FIGURE 7;

FIGURE 9 is an enlarged transverse vertical section taken on line 9—9 of FIGURE 7;

FIGURE 10 is an enlarged longitudinal vertical section taken on line 10—10 of FIGURE 7;

FIGURE 11 is an enlarged fragmentary horizontal section taken on line 11—11 of FIGURE 7;

FIGURE 15 is an exploded perspective view of a modification employing divider panels to produce separated cells within the raceway;

FIGURE 16 is an enlarged transverse vertical section through a divider panel and associated elements; and FIGURE 17 is an enlarged fragmentary longitudinal vertical section through the modified raceway showing the abutting of the ends of two adjacent divider panels.

Figure 1:
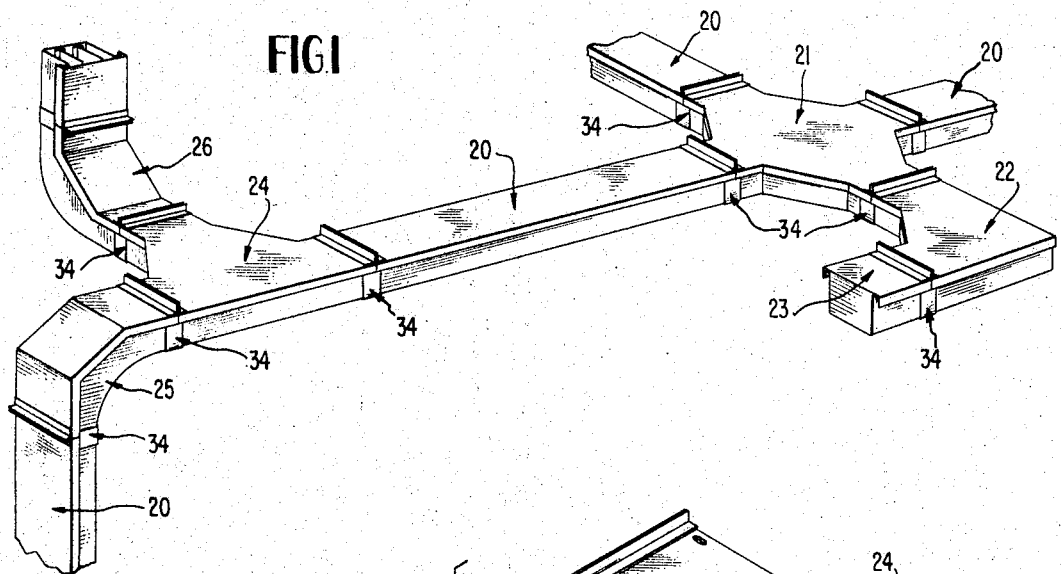
Figure 2:
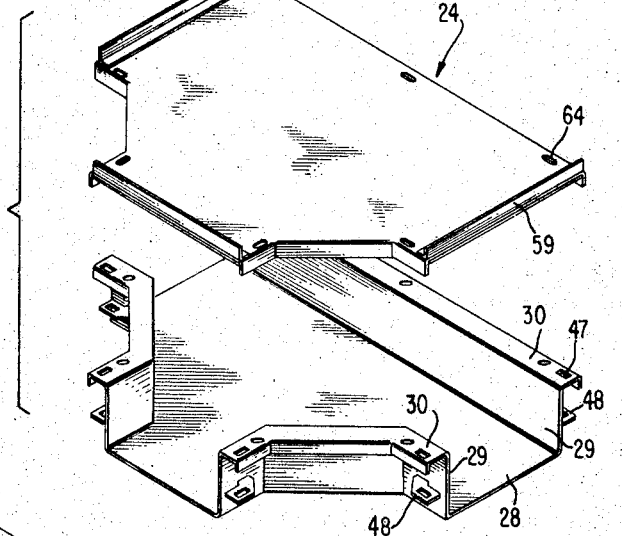
FIGURES 2, 3, 4, 5 and 6 are exploded perspective views of several typical raceway components which may be employed throughout the system at various points.
Figure 3:
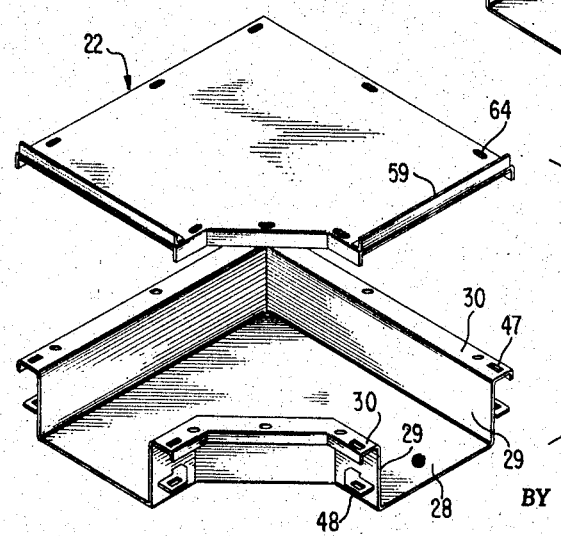
Figure 4:
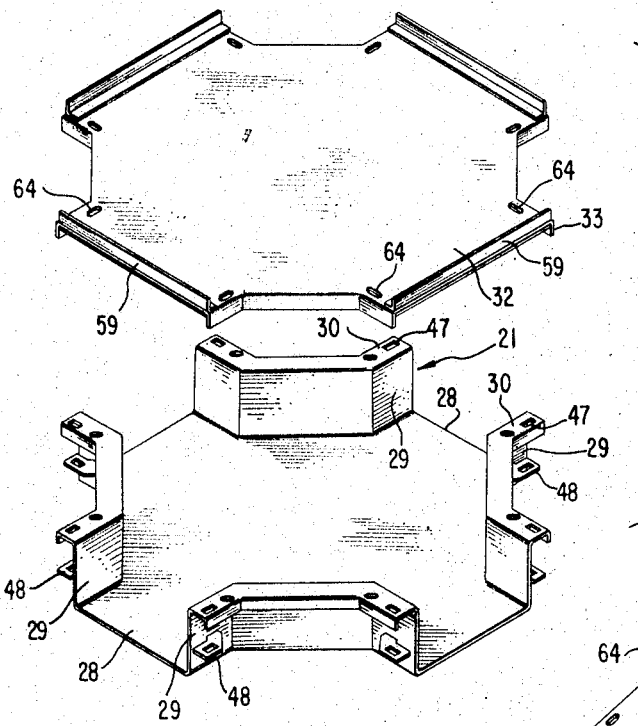
Figure 5:
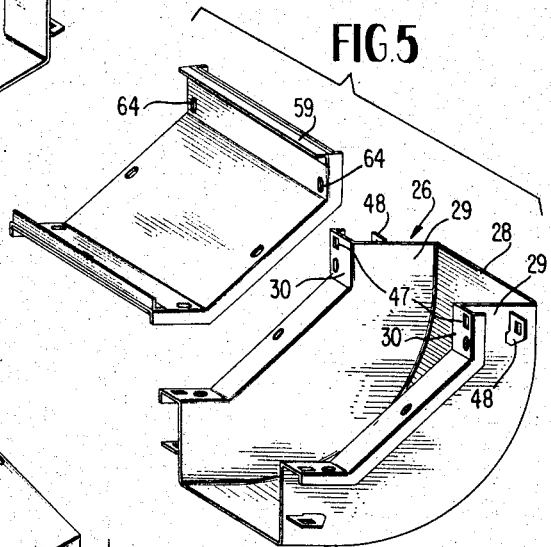
Figure 6:
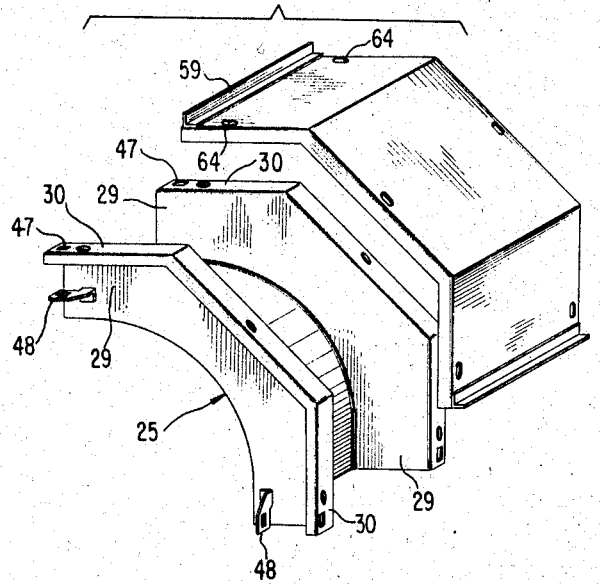

In the drawings wherein for the purpose of illustration are shown preferred embodiments of the invention, attention is directed first to FIGURES 1 through 14 showing a preferred embodiment. FIGURE 1 in particular illustrates sowewhat diagrammatically one possible arrangement or layout for the cable raceway embodying the invention. Various modified layouts may be constructed utilizing the principles of the invention. The layout in FIGURE 1 which is illustrative embodies a plurality of straight raceway sections 20 extending in various directions in both horizontal and vertical planes. Interconnecting certain ones of the straight sections 20 is a typical cross 21. A typical flat elbow 22 leads from one arm to the cross 21 and connects with a closed or stub end 23. A typical T section 24 is interposed between one straight section 20 and one typical external elbow 25 and a typical internal elbow 26 leading to another straight raceway section. It should be clear that by utilizing different arrangements of the typical components shown in FIGURE 1 a variety of layouts or systems can be devised according to the invention and it is thought to be unnecessary to further describe or illustrate the invention in terms of overall arrangement of components.

As illustrated in the drawings, each typical section or component of the raceway has certain common or standard characteristics with all other components, thereby making the invention practical to manufacture and easy to install. In this connection, FIGURE 7 shows fragments of two adjacent straight raceway sections 20 which are connected end-to-end by a typical slip joint which forms a very important feature of the invention and will be fully described in conjunction with FIGURES 9 through 12 and other figures of the drawings. The identical joint between the two straight sections 20 in FIGURE 7 is utilized between all of the various raceway components 20 through 26 shown in FIGURE 1. That is to say, wherever throughout the system any of the various shaped sections are connected with each other or with straight sections 20, the connecting joint is identical with the joint illustrated in FIGURE 7 and in all of the detail views which relate to FIGURE 7. Therefore, a single detailed description of this typical joint will suffice to describe all of the joints in the cable raceway.

In like manner, every component shown in FIGURE 1 has certain other standard characteristics throughout the entire system. Again referring to FIGURE 7 for simplicity, every component or unit of the raceway embodies a channel or trough 27 which is U-shaped in cross section and includes a flat bottom wall 28 and a pair of upstanding side walls 29 arranged at right angles to the bottom wall and formed integral therewith. The size of the channel or trough 27 in terms of its overall width and height may vary depending upon particular installations. The height may range from about 4″–12″ and the width from about 4″–18″. These dimensions are not critical and are mentioned merely to explain the general size characteristics of the invention.

Continuing to refer to standard or typical constructional features of the invention, each channel or trough 27 has a pair of top flat relatively wide outwardly extending continuous flange 30 integral therewith and arranged at right angles to side walls 29. For increased rigidity, the top flanges 30 carry outer downturned short extension 31.

Referring to FIGURES 2 through 6 of the drawings, it may be observed that every variously-shaped component of the raceway system incorporates the basic structural parts enumerated above in connection with FIGURE 7. Therefore, the same reference numerals employed above in describing these common or standard features are utilized on corresponding parts throughout FIGURES 2 through 6. It is believed that this identification of parts in FIGURES 2 through 6 will be adequate to teach the construction of the various components in light of the foregoing descriptions in connection with FIGURES 1 and 7.

Another standard feature of construction, referring to FIGURE 7 and to FIGURE 8, is that every component in the overall system shown in FIGURE 1 includes a generally flat cover 32 conforming to the overall shape of the underlying channel or trough, whether straight or in the form of an elbow, T, cross or the like. Each cover 32 carries a pair of downturned marginal flanges 33 which lie outwardly of and close to the extensions 31 in assembly. These features of construction which are common to all components of the raceway are also identified throughout FIGURES 2 through 6 inclusive, and it is thought that any further description of the shapes of the components in FIGURES 2 to 6 should be unnecessary to a proper understanding of the invention and is quite obvious from an inspection of these figures taken in conjunction with FIGURE 1.

The features of construction common to all components and forming an essential part of the invention novelty will now be described in detail in connection with FIGURES 7 through 14, and again, the elements shown in these figures now to be described are common to the components in FIGURES 2 through 6. This will become clearer as the description proceeds.

With continued reference to FIGURES 7 through 14, the numeral 34 designates a connector unit for adjacent sections or components of the raceway system, whether straight sections as in FIGURE 7 or variously-shaped sections as in FIGURES 2 through 6. The standard connector unit 34 is indicated at a number of points in FIGURE 1 to illustrate the overall construction of the system.

The unit 34 comprises an exterior generally U-shaped strap 35 or very short channel section having connected side and bottom walls, as shown, conforming substantially to the cross sectional shape of the aforementioned channel 27. The strap 35 has outwardly directed integral flat flanges 36 including downturned extensions 37, and the flanges 36 are adapted to underlie the trough flanges 30 in assembly as shown in FIGURES 9 and 12, for example.

Figure 12:
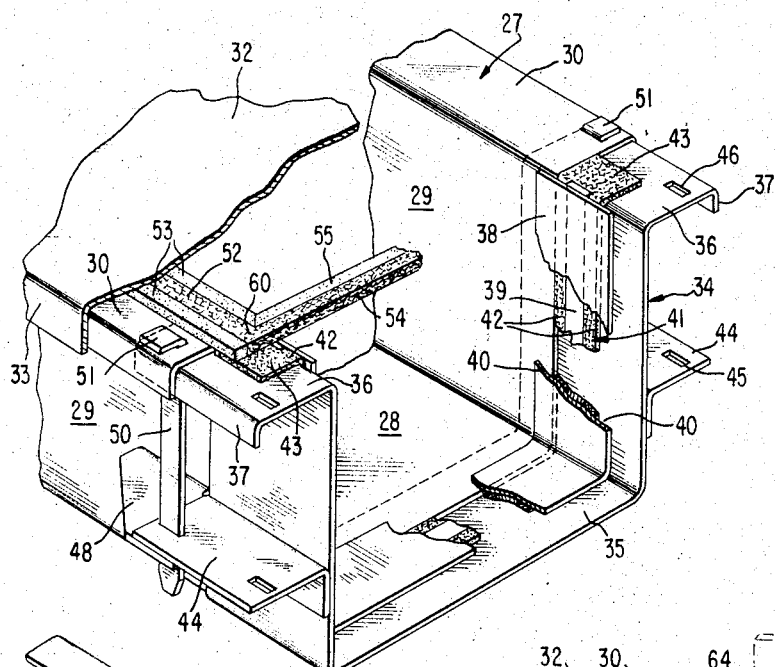
FIGURE 12 is a fragmentary perspective view of a partially assembled typical raceway joint with parts broken away and parts omitted to reveal gasketing.
Figure 13:
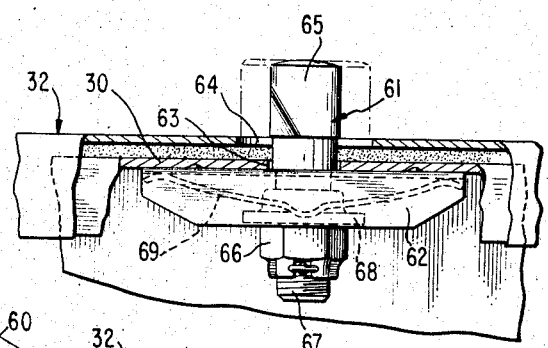
FIGURE 13 is an enlarged fragmentary section through a portion of a duct cover section and underlying duct flange adjacent a fastener device which is used throughout the system.

The connector unit 34 further embodies an interior U-shaped strap 38 somewhat narrower than the outer strap 35 and centered between the ends of the strap 35, as shown in FIGURES 8 and 12. The inner and outer straps 38 and 35 are separated by a U-shaped relatively thin spacer 39 which extends continuously between the vertical and horizontal portions of the two straps 35 and 38 and is centered laterally with respect thereto as shown. The elements 35, 38 and 39 are permanently connected so as to form a rigid unit by spot welding or the like. Hence, each typical connector unit 34 comprises the three elements 35, 38 and 39 in permanently assembled relationship and with the tops of the elements 38 and 39 projecting just slightly above the tops of flanges 36 by an amount equal to the thickness of one of the flanges 30. This arrangement provides within each connector unit 34 a pair of continuous U-shaped passages 40, FIGURE 12, on opposite sides of the U-shaped spacer 39. These passages 40 receive a metallic gasket 41 which constitutes an essential and important feature of the raceway. It might be mentioned here for ready reference throughout the description that the material employed for the gasket 41 in each connector unit 34, as well as for all of the metallic gasketing to be described, is a knitted Monel metal gasketing produced by Metex Electronics Corporation, Clark, N.J. In general, knitted metallic gasketing is known in the art and is described in a number of prior patents including United States Patents 2,727,084; 2,761,203; 2,882,082; 2,924,471, and others. This knitted metallic gasketing under a proper degree of compression is fully capable of sealing or rendering the cable raceway RF energy tight. As disclosed in said prior art patents, the metallic knitted gasketing material is customarily rolled to form a body of several layers jacketed in an outer knitted layer. This renders the composite structure highly resilient or compressible. This is the nature of the Monel metal gasketing employed throughout the raceway system to be further described.

The Monel metal gasketing is essentially tin plated, copper clad, soft iron wire in knitted form and the nature of the metal is well known.

Further concerning the nature of materials employed, all of the channels 27, covers 32 and the corresponding parts of the components in FIGURES 2 through 6 are formed preferably of 14 gauge sheet steel produced by Bethlehem Steel Company, Bethlehem, Pa., and sold under the name "Beth namel." This material contains the maximum of .01% carbon, maximum of .5% manganese, and a maximum of .1% phosphorus, sulphur and silicon. All of the sheet steel parts are coated all over with a 2½ oz. zinc galvanize coating of the class defined in ASTM spec. #A525, with aluminum added to the coating as defined in the same ASTM spec. It has been discovered that this particular combination of materials imparts to the raceway structure an exceedingly great ability to shield or prevent the escape of RF energy from cables contained therein.

Returning to FIGURES 8 and 10–12, the knitted metallic gasket 41 of the connector unit 34 embodies two separated parallel branches 42 which lie on opposite sides of the spacer 39 within the passages 40. These branches of the gasket extend continuously along the vertical and horizontal portions of the connector unit, as shown clearly in the drawings. The ends of the branches 42 carry enlarged rectangular pads 43 of the knitted metallic material formed integral therewith and which pads lie directly upon the top faces of horizontal flanges 36. This particular construction of the gasket 41 is believed to be a unique feature for insuring the continuous electrical connection between adjacent connected channels or sections of the raceway and between adjacent cover sections, as will be more fully described.

It may now be seen by a consideration of FIGURES 10, 11 and 12 that the connector unit 34 forms a slip-type connection with the ends of the adjacent two channels or sections 27. More specifically, the ends of the channels engage between the U-shaped straps 35 and 38 and enter the opposed passages 40. The extreme ends of the channels abut the opposite edges of the metallic gasket 41 and establish an electrical contact therewith throughout the entire U-shaped configuration. The flanges 30 of the channels slip over the flanges 36 of the connector unit and electrical contact is made with opposite edges of the pads 43, as clearly shown in FIGURE 12.

In order to positively join each pair of channels 27 with the connector unit 34 so as to allow ready separation of the elements whenever required, the following arrangement is provided. A pair of L-shaped brackets 44 are secured by welding or the like to the opposite vertical sides of each connector unit 34 somewhat above the bottom thereof. Each bracket 44 has a pair of spaced elongated openings 45 formed therethrough. The overlying flanges 36 have correspondingly spaced elongated openings 46 formed therethrough, in vertical alignment with the openings 45. In like manner, the flanges 30 each have a single elongated opening 47 near the end thereof to register with the openings 46 in assembly. Additional L-shaped brackets 48 are welded to the side walls of each channel 27 near the ends thereof and have elongated openings 49 formed through their horizontal parts, directly below and in alignment with the openings 47. In assembly, the brackets 48 lie immediately below the brackets 44 and the openings 45 and 49 register. With the channels 27 and connector unit 34 slipped together as depicted in FIGURES 7 and 10–12, the aforementioned openings of the brackets and flanges are in registration and connecting pins 50 are applied through the registering openings to firmly and positively lock the parts in assembled relationship, as shown. The pins 50 conform in cross sectional shape to the elongated openings 45, 46, etc. and the pins extend from the tops of flanges 30 to points below the brackets 48. The pins 50 have thin lateral heads 51 which engage upon the tops of flanges 30 underneath the covers of the raceway. These heads permit the pins to be easily dislodged from their openings with a screwdriver or the like when it is desired to separate the sections of the raceway. The arrangement is very strong, economical and renders assembly and disassembly of the major parts quite easy. The pins hold the two adjacent channels 27 in firm contacting relationship with the opposite sides of the metallic gasket 41, as before described.

The covers 32 are also provided on their undersides and directly above the horizontal longitudinal flanges 30 with continuous longitudinal strips 52 of gasketing, formed from the same knitted metallic material utilized for the gaskets 41. The strips 52 extend uninterrupted for the full lengths of the covers and straight channels 27 which are usually about five feet long in a typical system. The metallic gasket strips 52 are preferably bounded on opposite sides by relatively narrow rectangular strips 53 of neoprene foam or some other rubber-like material, adhesively secured to opposite sides of the strips 52 and also adhesively secured to the under face of the cover 32. The sole purpose of the strips 53 is for attaching the metallic gasket strips 52 to the metal covers. If preferred, some different method of attaching the metallic gasketing to the covers could be employed. For example, edge portions of the metallic gasketing could be flattened out or compressed and then spot welded to the covers within the scope of the invention. The strips 52 in assembly establish a continuous electrical contact between the covers 32 and the flanges 30 of channels 27.

Figure 14:
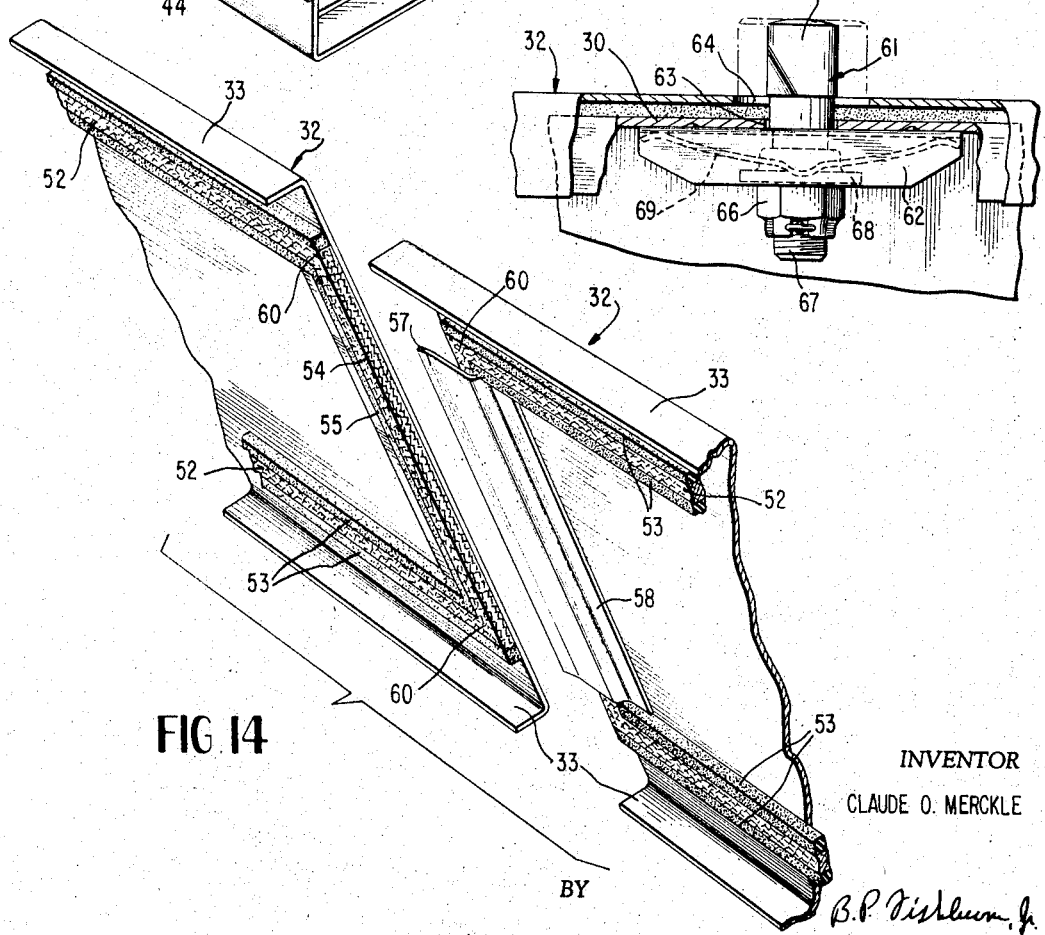
FIGURE 14 is an exploded perspective view of two adjacent cover portions of sections of the raceway.

Additionally, the opposed or meeting ends of each pair of covers 32 have transverse metallic gasketing strips 54 mounted on their bottom sides adjacent their end transverse edges and projecting slightly therebeyond prior to being compressed in assembly, as shown in FIGURE 10 for example. The metallic strips 54 are preferably joined integrally to the longitudinal strips 52, as shown clearly in FIGURES 12 and 14. The strip 54 on one cover 32, FIGURE 10, is secured adhesively on its inner side to a neoprene carrier strip 55, which in turn is adhesively secured to the cover 32 and backed up on its inner side by a metal L-shaped bar or bracket 56 which prevents the adjacent metal gasketing strip 54 from sagging inwardly under compression, FIGURE 10. The opposing strip 54, FIGURE 10, is held in place on the other cover 32 by an underlying lip 57 which also projects beneath the gasketing strip 54 having the element 55 cemented thereto. The lip 57 has an extension 58 welded or otherwise rigidly secured to the bottom of the adjacent cover 32. Consequently, the metal gasketing strip 54 within the lip 57 requires no neoprene carrier strip for securing it to the adjacent cover 32. The lip 57 as shown in FIGURES 8 and 14 extends for the major portion of the length of the transverse gasketing strips 54 but does terminate somewhat inwardly of the sides of the cover 32, as shown. In assembly, FIGURE 10, the lip 57 supports both metallic gasketing strips 54 and prevents them from sagging downwardly, whereby the two strips are held in firm electrical contact at their abutting edges and under the necessary compression to render the assembly RF energy tight at the joints between cover sections. To further assure this objective, each cover 32 is provided at its ends with L-shaped stiffening bars 59 welded or otherwise rigidly secured thereto. These bars render the covers sufficient rigid transversely to prevent any bowing thereof adjacent the strips 54 which would tend to disrupt the electrical connections and allow leakage of RF signals.

It may be further noted in FIGURE 12, for example, that the corner regions 60 formed by each intersecting pair of gasketing strips 52 and 54 lie directly and are in electrical contact with the underlying pads 43. Thus, at the completely assembled typical joint between any two sections of the raceway, whether straight sections or modified sections as shown in FIGURES 2 through 6, there is a complete sealing of RF energy between the ends of adjacent channels or sections and the connector units 34 and between the covers and the underlying channels and also between the transverse ends of the covers, as shown particularly in FIGURE 10. When the parts are properly drawn together in assembly, there is virtually no possibility for the RF energy to escape and the raceway compares favorably in its ability to shield or retain RF energy with a completely closed conduit of like shielding material.

Means are provided to detachably secure each cover section of the cable raceway firmly to the underlying channel or body section. For this purpose, it is preferred to employ a conventional one-quarter turn quick release fastener assembly 61 manufactured and sold by Simmons Fastener Corporation, North Broadway, Albany 1, New York. The particular fastener assembly is commercially designated as a "cam-bolt" fastener, preferably of a ⅜ inch diameter nominal size. Other sizes may be employed depending upon the size of the particular raceway. Typically, the fastener assemblies 61 are spaced on about 3½–4-inch centers along the cover sections and the underlying flanges 30 of the raceway. In any event, the spacing of the fasteners is such that the cover gasketing 52 will be uniformly compressed against the flanges 30 without any gaps which would allow the leakage of RF energy. Since the fastener assemblies 61 are well known commercial items, they need not be described in great detail. Briefly, each fastener assembly includes a channel bracket 62 which is welded or otherwise rigidly secured to the bottom of the flange 30 at the desired location. A circular opening 63 of proper size is formed through the flange 30, FIGURE 13, and an elongated opening 64 is formed through the cover in order to receive the elongated turnable head 65 of the fastener. When the head 65 is turned to lie transversely of the opening 64 as shown in the drawings, the cover 32 is drawn firmly down against the flange 30 by the clamping action inherent in this type of fastener. The tension or holding force of the fastener may be adjusted through the medium of an adjusting nut 66 on the threaded shank 67 of the fastener, in conjunction with a cam washer 68 and leaf spring 69 also forming conventional parts of the fastener. The head 65 is turnable one-quarter turn in either direction between the release or locking positions. As shown in FIGURES 7 and 8, for example, care is taken to place one of the fastener assemblies at each end of each cover section near the corner thereof. The fasteners are equidistantly spaced along the entire length of the raceway. It has been found that this particular form of fastener is highly convenient in rendering the covers quickly removable without the use of special tools and also in providing the required gasket compression with uniformity. However, if preferred, other types of similar fasteners could be employed without departing from the invention.

The above is a full detailed description of a typical connection or joint between sections of the raceway and associated covers and gasketing. While the detailed description for convenience and simplicity has been keyed to the straight raceway sections 20 shown in FIGURE 7, it should be quite obvious without the necessity of repeating the detailed description that the same typical joints are present in connection with the variously-shaped components shown in FIGURES 1 through 6. That is to say, the identical connector unit 34 with its gasket 41 is present between any and all of the variously-shaped components 20 through 26 shown in FIGURE 1. As shown in that figure, one of the typical connector units 34 is present at each separable joint between components although certain small parts have been omitted from FIGURE 1 for simplicity. It is even more clear from an inspection of FIGURES 2 through 6 and the reference numerals therein that the components of the system are all adapted to be coupled in the same manner with the typical connector unit 34. Furthermore, in FIGURES 2 through 6, it will be apparent that the parts are all constructed to utilize the identical fastener assembly 61 and the identical arrangement of gasketing between the covers and the horizontal flanges of the underlying body parts of the system. The only difference in comparing the components in FIGURES 2 through 6 with the basic straight sections 20 described above in detail is that the shapes of covers and body portions in FIGURES 2 through 6 have been modified to meet the requirements of a system such as that depicted in FIGURE 1. It will be further noted in FIGURES 2 through 6 that the various ends of the covers and body portions where they make connection with the typical unit 34 are all provided with the same characteristic cross sectional shape shown and described above in connection with FIGURE 7 and FIGURE 12, for example. It is therefore believed that no further detailed description is required in connection with FIGURES 2 through 6, other than to state that the gasketing is continuous and uninterrupted between the variously-shaped covers and the abutting flanges of the underlying body portions of the raceway and the gasketing serves the identical purpose that it serves in the typical straight sections 20.

FIGURES 15 through 17 show a modification and refinement of the cable raceway where the same is divided into separated parallel cells by means of spaced parallel divider plates 70. These divider plates extend for the full height of each channel or body portion 71 and extend continuously longitudinally therethrough. The lower ends of divider plates 70 are formed as in FIGURE 16 to provide projecting portions 72 on opposite sides thereof having slidable engagement within channel rails 73 which may be welded to the bottom walls 74 of the channel or body portions 71. The individual divider plates 70 may be readily removed endwise from the holding channels 73, if desired. As depicted in FIGURE 17, when two adjacent straight sections 71 are connected in assembly by one of the identical connector units 34, previously described, the projecting end portions 75 of adjacent pairs of divider plates 70 meet or abut edgewise, as shown, so that the cells between the plates will have no openings. In all other respects, the construction is identical to that previously described in the prior form of the invention. The arrangement in FIGURES 15 through 17 simply enables the separation of certain wires or cables or groups of wires and cables within the raceway system as is sometimes required or desirable. In other cases, the divider plates 70 may be omitted entirely and this feature is optional.

The use or operation of the cable raceway for housing and shielding various types of cables against the escape of RF energy to any significant extent is thought to be quite apparent to anyone skilled in the art without the need for further explanation. The technical or electronics principles which are involved are well known and need not be dealt with here and the invention resides primarily in the materials which are employed and the mechanical construction of the raceway.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

The invention having been described, what is claimed is:

1. An RF energy retaining raceway for communications cables comprising plural raceway sections each having a trough-like body portion into which the cables are laid and a readily removable cover substantially coextensive therewith, connector units for adjacent raceway sections, each connector unit comprising a short trough-like member having telescoping interfitting engagement with end portions of an adjacent pair of raceway sections, apertured flange parts on the raceway sections and each connector unit, connector pins engaging through the apertures of the flange parts while the apertures are in registration and securing the connector unit and said sections substantially rigidly in assembled relation, metallic RF energy shielding gasketing arranged between each cover and raceway section and extending continuously along the sides and across the ends of the cover, a section of metallic RF energy shielding gasketing on each connector unit extending across the bottom and up the side walls of the unit and including terminal portions on the flange parts of the connector unit, the ends of adjacent raceway sections electrically contacting the section of gasketing on the connector unit at the bottom and side walls of the unit and raceway sections, opposed end portions of adjacent covers overlapping the flange parts of each connector unit and the end transverse sections of the metallic gasketing on the covers lying upon and electrically contacting said terminal portions of gasketing on the connector unit, and readily releasable fasteners interconnecting each cover and raceway section and applying substantially even pressure to the gasketing between the cover and raceway section.

2. An RF energy retaining raceway for communications cables according to claim 1, and side flanges on each raceway section at the top thereof projecting outwardly of the side walls of the raceway section and being apertured at intervals along the raceway section, each cover resting upon said flanges of the underlying raceway section and having correspondingly spaced apertures registering with the apertures of the raceway section flanges, said reigstering apertures of the cover and flanges receiving said releasable fasteners, the gasketing along the sides of the cover resting upon the flanges of the raceway section and being compressed by the fasteners therebetween.

3. An RF energy retaining raceway for communications cables according to claim 1, and wherein all of said gasketing is knitted metallic gasketing.

4. An RF energy retaining raceway for communications cables according to claim 3, and strips of rubberlike material extending along the edges of the metallic gasketing on each cover and adhered to the metallic gasketing and to the cover and thereby supporting the metallic gasketing.

5. An RF retaining raceway for communications cables according to claim 1, and a substantially rigid supporting element for the gasketing extending transversely across the ends of adjacent covers and preventing sagging of such gasketing.

6. An RF energy retaining raceway for communications cables according to claim 5, and wherein said supporting element is a projecting lip on the end of one cover engaging under the gasketing extending across the ends of an adjacent pair of said covers.

7. In an RF energy retaining raceway system for communications cables of the type into which cables may be laid, a pair of adjacent raceway section body portions each being generally U-shaped in cross section and formed of sheet metal and being open at their tops and each including side longitudinal flanges projecting laterally outwardly from the tops of the body portions and secured to the side walls thereof, a substantially U-shaped connector unit for opposing ends of said body portions and having telescoping overlapping engagement with the ends of the body portions, said connector unit comprising an exterior substantially U-shaped member, an interior substantially U-shaped member of lesser width than the exterior member and an intervening substantially U-shaped spacer element between the exterior and interior members and forming with said members substantially U-shaped socket recesses receiving the ends of said body portions, outwardly projecting lateral flanges carried by the top of the connector unit and underlying the flanges of the body portions when the connector unit is assembled therewith, a metal gasketing section mounted on the connector unit and including terminal end portions on the flanges of said unit and divided branches which extend on opposite sides of the spacer element within the socket recesses, said branches extending continuously within the U-shaped socket recesses and electrically contacting the ends edges of the body portions in assembly, metallic covers for said body portions resting upon the side flanges of the body portions and having ends which extend somewhat beyond the opposing ends of the body portions so as to overlap the flanges of the connector unit in assembly, metal gasketing on the underside of each cover extending continuously along the sides and across the ends thereof and having corner regions which lie upon and electrically contact said terminal end portions of the gasketing section on the connector unit, and fastener means for detachably securing the covers upon said body portions and for compressing the metal gasketing with uniform pressure throughout the system, said fastener means connected with the covers and the side flanges of the body portions outwardly of the cover gasketing, whereby the raceway sections have no openings through which RF energy may escape.

8. In an RF energy retaining raceway system for communications cables according to claim 7, said connector unit and body portions being separable and the flanges of the body portions and said unit having registering apertures, and locking pins engaging through the registering apertures to interlock the body portions and connector unit in assembled relationship.

9. In an RF energy retaining raceway system for communications cables according to claim 7, said fastener means comprising a plurality of quick release spring-loaded cam fasteners arranged at spaced intervals along the lengths of the covers and side flanges of the body portions.

10. An RF energy retaining raceway for communications cables comprising plural trough-like raceway body portions into which cables are laid, a cover for each body portion, a connector unit for adjacent raceway body portions, said connector unit comprising a relatively short trough-like member having telescoping interfitting engagement with end portions of an adjacent pair of raceway body portions, releasable connector means positively connecting each connector unit with said adjacent pair of raceway body portions in said telescoping interfitting engagement, metallic RF energy retaining gasketing arranged between each cover and body portion and extending continuously along the sides and across the ends of the cover, a section of metallic RF energy shielding gasketing on each connector unit extending across the bottom wall and up the side walls of the unit and including terminal portions at the top of the unit on opposite sides thereof, the ends of the adjacent raceway body portions electrically contacting the opposite sides of said section of gasketing on the connector unit at the bottom wall and side walls of the unit and body portions, opposed end portions of adjacent covers overlapping the connector unit and the end transverse sections of metallic gasketing on the covers electrically contacting said terminal portions of gasketing on the connector unit, and fastener means interconnecting each cover and raceway body portion and compressing the metallic gasketing therebetween.

References Cited

UNITED STATES PATENTS

| | | |
|---|---|---|
| 1,986,965 | 1/1935 | Frank. |
| 2,316,166 | 4/1943 | Huguelett. |
| 2,917,083 | 12/1959 | Duval et al. _____ 174—68 X |

FOREIGN PATENTS

| | | |
|---|---|---|
| 660,919 | 11/1951 | Great Britain. |

DARRELL L. CLAY, *Primary Examiner.*